May 31, 1949.   A. T. COLWELL   2,471,936
METHOD OF MAKING POPPET VALVES
Filed Jan. 21, 1944
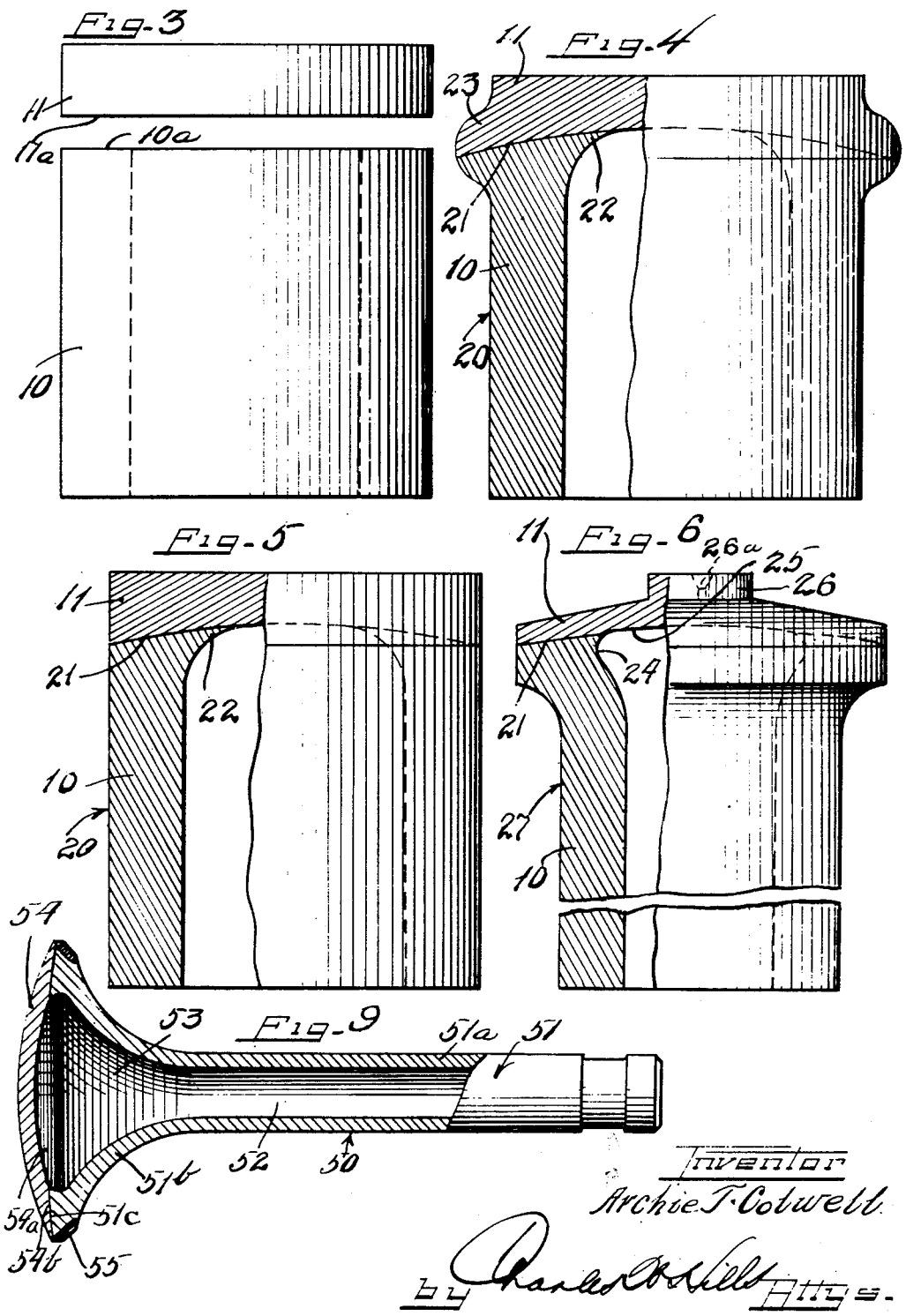

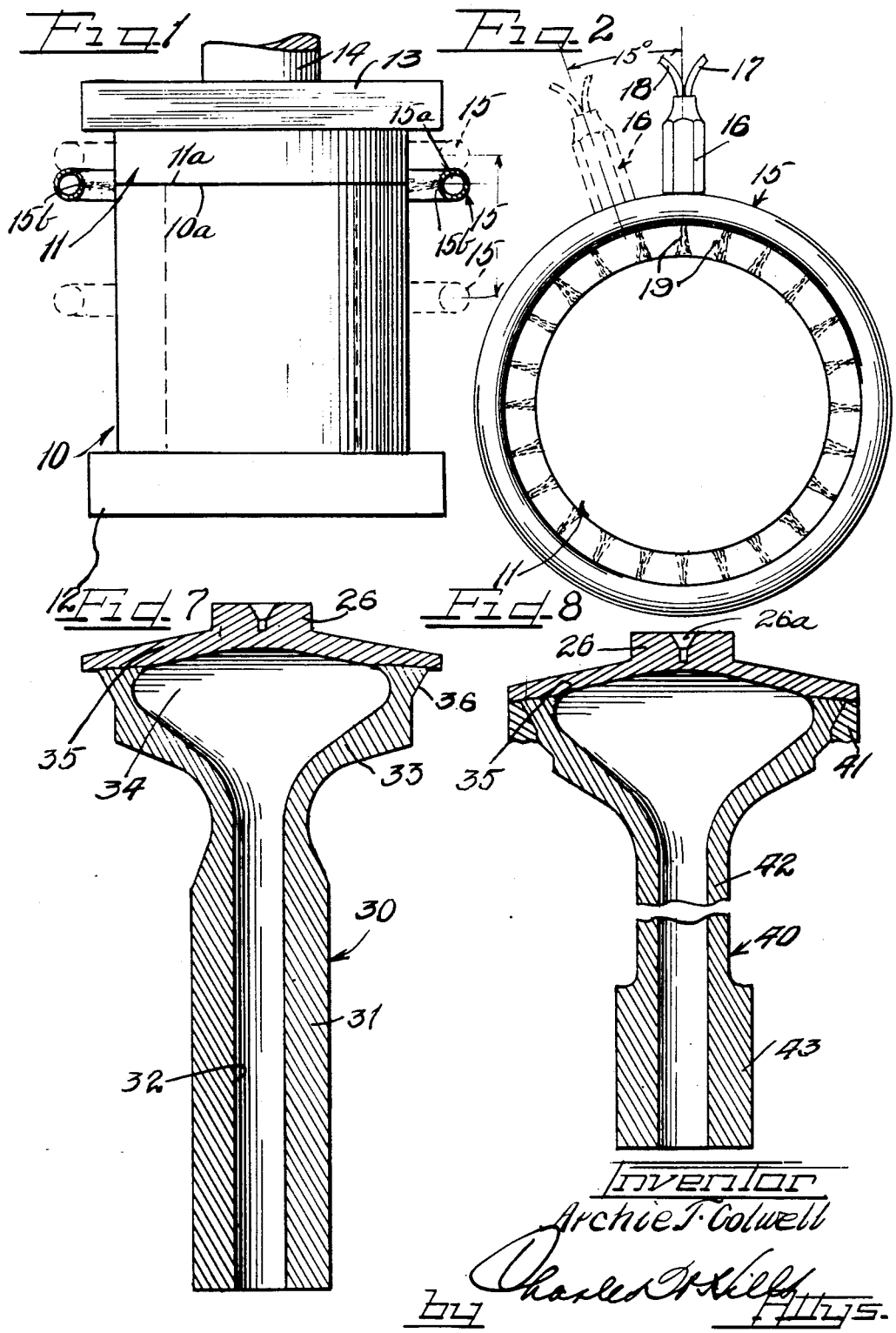

Patented May 31, 1949

2,471,936

UNITED STATES PATENT OFFICE 2,471,936

METHOD OF MAKING POPPET VALVES

Archie T. Colwell, Cleveland, Ohio, assignor to Thompson Products, Inc., a corporation of Ohio Application January 21, 1944, Serial No. 519,140

2 Claims. (Cl. 29—156.7)

This invention relates to the production of composite poppet valves from hollow metal cylinders and solid metal disks.

More specifically the invention relates to hollow poppet valves having head domes composed of corrosion-resistant metal welded to a body portion composed of stress-resisting base metal throughout a weld area greater than the cross-sectional area of the body member.

According to this invention, a corrosion-resistant solid metal disk is provided with a clean, smooth end face for mating with the clean, smooth end face or rim end of a hollow metal cylinder composed of stress-resisting steel. The metal disk and metal cylinder are pressed together with their clean, smooth surfaces in surface-to-surface contact to exclude air from the interface formed by the contacting surfaces. Pressures from 300 to 6000 pounds per square inch of contacting surface can be used and the contacting surfaces are heated by applying heat uniformly around the periphery of the disk and cylinder adjacent the contacting surfaces. The heat may conveniently be supplied from oxyacetylene jets issuing from a ring piece surrounding the disk and cylinder. This ring piece is preferably moved in an axial direction relative to the disk and cylinder to extend the heating on both sides of the contacting surfaces. The ring is also preferably oscillated so that the flame jets do not constantly impinge upon the same areas around the periphery of the assembly. The contacting surfaces are thus heated, from heat applied at their outer extremities, to welding temperatures which are below the melting points of the metals. Suitable welding temperatures will depend upon the composition of the metals, but are usually between around 1000° C. and about 1300° C.

The high pressure on the contacting surfaces is continued throughout the heating operation and, as the metal softens, it will be upset by these pressures to form a bead around the assembly. The weld line formed is thin, well defined, and of arcuate annular contour.

In accordance with this invention, the welded-together disk and cylinder form an integral bimetal hollow blank from which a poppet valve of this invention is made. The bead of the blank is removed and the resulting blank is extruded, milled, and machined to form a headed cup-shaped blank. This cup-shaped blank is then extruded, grooved around its head, subjected to a groove-filling metal puddling operation, and contoured to final poppet valve shape. A poppet valve is thus formed composed of a stress-resisting metal body portion and a corrosion-resistant head dome portion perfectly welded to the body portion along an arcuate weld line having a greater area than the cross-sectional area of the body.

The pressure-welding technique, by exclusion of all air, gases and other impurities from the surfaces being welded, insures formation of a sound weld free from flash. Butt welds and flash welds have proven unsatisfactory in poppet valves because the metal is burned during the welding operation and part of it flashes on the inside of the valve, requiring difficult cleaning operations to completely remove it. The pressure weld, on the other hand, does not form flash, and does not burn the metal. The pressure weld furthermore produces an increased weld area of arcuate contour which adds to the strength of the welded bond.

It is, then, an object of this invention to provide poppet valves having head domes and body portions welded together throughout an area larger than the cross-sectional area of the body member.

A further object of the invention is to provide composite hollow poppet valves having corrosion-resistant head domes and forged stress-resistant body portions integrally joined together by a pressure weld.

A still further object of the invention is to provide a hollow poppet valve having a stress-resisting hollow body portion forming the stem and neck of the valve and a cast corrosion-resistant head dome portion receiving a convex mouth or rim end of the body portion in integral welded relation.

A still further object of the invention is to provide a method for producing hollow poppet valves having stress-resisting body portions and corrosion-resisting head domes wherein corrosion-resistant metal pieces are pressure-welded to hollow stress-resistant metal cylinders.

A still further object of the invention is to provide a hollow poppet valve composed of a forged metal stem body portion having a hollow outwardly flaring tulip end terminating in a convex rim and a cast head dome having an annular concave portion receiving said convex rim in intimate welded relation thereto.

Another object of the invention is to provide a process for making composite poppet valves having unforgeable metal head domes and forgeable metal body portions in integral welded-together relation.

Other and further objects of the invention will be apparent to those skilled in the art from the following detailed description of the annexed sheets of drawings which, by way of preferred examples only, illustrate two embodiments of the invention.

On the drawings:

Figure 1 is a side-elevational view of a cast metal disk and a forgeable metal cylinder held in end-to-end pressure relation by a pressure apparatus and being heated adjacent the contacting surfaces thereof by a torch ring shown in vertical cross section.

Figure 2 is a plan view of the torch ring and disk and billet assembly illustrating the manner in which flame jets are impinged on the assembly.

Figure 3 is a side elevational view of the cast metal disk and the hollow forgeable metal cylinder used as the starting materials for the process of this invention.

Figure 4 is a side elevational view, with parts broken away and shown in longitudinal cross section, of the disk and cylinder of Figure 3 pressure welded together to form a bi-metal blank.

Figure 5 is a view similar to Figure 4 illustrating the bi-metal blank after the upset portion formed by the pressure welding operation has been removed.

Figure 6 is a broken side elevational view, with parts in longitudinal cross section, illustrating a blank formed from the blank of Figure 5 in an intermediate stage of making the finished poppet valve.

Figure 7 is an axial cross-sectional view with parts in elevation of a poppet valve blank formed from the blank of Figure 6 by additional extruding and machining operations.

Figure 8 is a side elevational view, with a part in axial cross section, of a poppet valve blank prepared from the blank of Figure 6 by welding and machining operations.

Figure 9 is an axial cross-sectional view, with parts in elevation, of a finished poppet valve produced according to the steps illustrated in Figures 1 to 8.

As shown on the drawings:

In Figure 1, the reference numeral 10 designates a hollow cylindrical open-ended billet composed of forgeable stress-resisting metal such as an austinitic steel. If heat and corrosion-resistant properties are desired in the body portion of the valve to be formed according to this invention, the billet can be a nickel-chromium alloy austenitic steel such as one having the following formula:

| | Per cent |
|---|---|
| Nickel | 14 |
| Chromium | 14 |
| Tungsten | 2.4 |
| Carbon | 0.45 |
| Molybdenum | 0.35 |
| Remainder—substantially all iron. | |

The billet 10 is provided with a clean, smooth, flat rim end face 10a. A solid cylindrical disk 11 having a clean, flat, smooth end face 11a is mounted on the billet 10 with the end face 11a thereof fully seated on the rim end face 10a of the billet in complete contact therewith throughout the entire rim area. The disk 11 is composed of corrosion-resisting metal, examples of which are nickel, chromium and iron alloys; nickel, molybdenum, and iron alloys; non-ferrous nickel-chromium alloys; chromium-tungsten alloys, and the like. The disk 11 is usually cast since the corrosion-resistant alloy is usually unforgeable and hard to machine.

The billet 10 with the disk 11 thereon is mounted on the base 12 of a press having a press head 13 for acting on the top of the disk 11. A ram 14 presses the billet and disk together between the base 12 and head 13 to exert pressures of from 300 to 6000 pounds per square inch of contacting surface 10a and 11a.

A torch head 15 in the form of a ring embraces the billet and disk assembly. This torch head 15 defines an annular passageway 15a completely enveloping the billet and disk. The torch head 15 has a plurality of jet holes 15b at spaced intervals around the inner periphery thereof joining the passageway 15a with the periphery of the billet and disk assembly. As shown in Figure 2, a fitting 16 joins oxygen and acetylene conduits 17 and 18 respectively with the head 15 to supply welding flame-producing gases to the passageway 15a. These gases will bleed out through the holes 15b to form jets 19 which are ignited for impinging on the billet and disk assembly.

As indicated in dotted lines in Figure 1, the torch head 15 is reciprocated axially of the disk and billet assembly to cover an area on both sides of the contacting surfaces 10a and 11a. Thus if the disk 11 is about one-half inch thick, the torch head 15 will be reciprocated to a height about one-quarter inch above the end face 11a of the disk. If the billet 10 is of about three inches in diameter and of a length sufficient to form a complete poppet valve body, the torch head 15 will be reciprocated along a length of the billet extending about an inch and a quarter from the end face 10a of the billet. Therefore the torch head 15 has an up-and-down reciprocal path about an inch and a half in length.

As indicated in Figure 2, the torch head 15 is also oscillated during the reciprocal movement thereof through an arc of about 15°. This oscillation will move the jets 19 around the billet and disk assembly so that they will not continually impinge upon the same spot of the assembly. A large number of jets 19 are preferred and, in a torch head for enveloping a three inch diameter billet and disk assembly, about thirty-two jets are used.

The jets 19 rapidly heat the billet and disk inwardly from the outer peripheries thereof so that the contacting surfaces 10a and 11a are heated by conduction until a welding temperature is reached. This welding temperature will depend upon the compositions of the billet and disk metals, but never reaches the melting points of these metals. Temperatures from about 1000° C. to about 1300° C. are generated throughout the contacting surfaces and, during the entire heating operation, the billet and disk assembly is continually subjected to the selected pressure within the above-mentioned range by the pressure ram 14. The press and torch head 15 may be water-jacketed or otherwise cooled to prevent overheating thereof by the flames.

As shown in Figure 3, the hollow cylindrical billet 10, composed of the stress-resisting forgeable metal is provided with the clean, smooth annular end wall 10a for receiving the clean, smooth end face 11a of a cast, corrosion-resisting solid metal disk 11. The billet 10 and disk 11 are welded together as described in connection with Figures 1 and 2 to produce the blank 20 of Figure 4 with a billet end 10 and a disk end 11 joined through an annular arcuate weld area 21 of greater area than the area of the rim end face 10a of the billet 10. Also, as shown in Figure 4, the end face of the billet 10, after the pressure-welding operation, bows inwardly as at 22 to extend the weld area radially inward from the initial inner wall of the billet. An upset bead 23 is also formed around the blank 20. This bead 23 is cut off from the blank as shown in Figure 5 and the blank 20 with the bead 23 cut off, still has the inwardly projecting portion 22 on the weld area 21.

As shown in Figure 6, the blank 20 of Figure 5 is extruded and machined to lengthen the billet end 10 thereof and to reduce the diameter of this end but the disk end 11 of the blank is not reduced in diameter. The hollow interior of the billet 10 is undercut at the disk end 11 thereof to provide an enlarged recess 24 which involves the removal of the inwardly extending weld portion 22 and also involves cutting a recess 25 in the disk 11. The remaining weld line 21 is therefore of concavo-convex contour with the end of the billet 10 being convex and extending into a concave peripheral portion of the end face of the disk 11 surrounding the recess 25. The disk 11 is machined to head dome contour but a lug 26 is allowed to remain at the center to provide a lathe-pin receiving hole 26a. A blank 27 is thus produced.

The blank 27 of Figure 6, as shown in Figure 7, is extruded and machined to provide a poppet valve shaped blank 30 having an elongated cylindrical stem portion 31 of larger diameter than valve stem diameter. The stem 31 has a hole 32 therethrough. The blank 30 has an outwardly flaring tulip end 33 on one end of the stem 31 defining a head cavity 34 covered by the head dome 35 composed of metal forming the disk 11. The stem 31 and tulip end 33 are composed of metal from the billet 10. The tulip end 33 has a groove 36 cut therearound with one side wall of the groove defined by metal of the head dome 35.

The blank 30 is subjected to a groove-filling welding operation and to additional machine operations for producing a blank 40 as shown in Figure 8. The blank 40 has a rim 41 of corrosion-resistant metal puddled therein. This metal can be the same as the metal forming the head dome if desired, and merges into the head dome metal. The stem 31 of the blank 30 is machined down in the blank 40 as at 42 to valve stem diameter size but a nubbin end 43 of larger than valve stem diameter remains at the tip end of the valve.

A valve 50 shown in Figure 9 is formed from the blank 40 of Figure 8 through additional machining and extruding operations similar to those described in connection with Figures 7 and 8. The valve 50 has a main body portion 51 composed of the stress-resisting forged metal from the billet 10 and defining a cylindrical stem 51a with an outwardly flaring tulip end 51b providing the valve neck and terminating in an annular convex rim 51c. The body 51 defines a stem cavity 52 and part of a head cavity 53 adapted to receive coolant material such as sodium.

The valve 50 has a head dome 54 composed of metal from the disk 11 and this dome has a recess 54a therein cooperating with the cavity 53 defined by the body portion 51 for forming an enlarged head cavity for the valve. The dome 54 has a concave rim portion 54b on the under face thereof receiving the convex portion 51c of the body member. A face 55 machined from the puddled in metal ring 41 (Figure 8) is provided adjacent the rim end 51c to provide the seating face for the valve merging into the head dome 54.

As is indicated by the relative thicknesses of the cylinder 10 shown in Figures 1 to 4, the extruded and machined stem and neck portions 31, 33, and 42 of the blanks shown in Figures 7 and 8, which portions are formed from the cylinder 10, and the stem and neck 51a and 51b of the finished valve shown in Figure 9, which portions are formed from the portion 42, the cylinder 10 has a wall thickness substantially greater than the wall thickness of the finished valve body.

From the above descriptions it will be understood that this invention now provides hollow poppet valves having head domes composed of corrosion-resisting metals welded onto forged stress-resisting metals defining the main body portion of the valve including the valve stem and valve neck. The head domes and body portions are pressure-welded together and the weld line therebetween is thin, well-defined, and of concavo-convex shape to provide an increased weld area. The invention makes possible the use of metals for poppet valve head domes which metals cannot be readily forged but which will withstand the tremendous heat and extreme corrosive conditions in the combustion chamber of an internal combustion engine better than any readily forgeable material while at the same time these unforgeable metals are not subjected to stress loads since all of these loads are carried by forged metals forming the body part of the valve.

It will, of course, be understood that various details of construction and procedure may be varied through a wide range without departing from the principles of this invention and it is, therefore, not the purpose to limit the patent granted hereon otherwise than necessitated by the scope of the appended claims.

I claim as my invention:

1. The method of making hollow poppet valves having cast relatively unforgeable corrosion-resistant head domes and forged stress-resistant body portions which comprises forming a smooth flat end face on a forged stress resistant hollow metal cylinder, forming a smooth flat mating end face on a relatively unforgeable corrosion resistant solid metal disk, pressing said end faces together for sealing the faces against the atmosphere surrounding the disk and cylinder, impinging a plurality of flame jets around the peripheries of the pressed-together disk and cylinder, moving said jets in axial and radial directions relative to said pressed-together disk and cylinder adjacent the contacting surfaces thereof for heating said surfaces by conduction through the metals radially inward from the peripheries thereof to welding temperatures below the melting points of the metal, continuing application of said pressure during said heating operation to upset the contacting surfaces into concavo-convex cross-sectional relationship and thereby forming a composite integral blank, forging the cylinder portion of the blank to form a valve body having a stem portion and an outwardly flaring tulip portion defining a valve neck, and machining the resulting forged blank into final poppet valve contour to provide a poppet valve with a metal head dome composed of disk metal and metal body portion composed of cylinder metal and said dome being joined to said body portion by an annular weld of greater width than the wall thickness of said valve neck.

2. The method of making a poppet valve which comprises providing a relatively unforgeable highly corrosion resistant metal disk with a flat clean and smooth end face, providing a forged stress resistant hollow metal cylinder with a flat clean and smooth rim end face and a wall thickness substantially greater than that desired for the valve body portion of the finished valve, pressing the flat face of the disk and the flat rim of the cylinder together to fully mate the faces in sealed relation, applying heat around the periphery of the cylinder adjacent said mated faces to heat said faces by conduction radially inward from their peripheries until said metals reach welding temperatures below the melting point of the lowest melting metal thereof, continuing pressing the faces together during said heating operation until said welding temperatures are reached for producing a composite metal blank with an arcuate cross-section, annular weld line within the original contacting span of said rim end face of the cylinder having a greater area than the initial area of said contacting faces, forging the hollow cylinder end of the blank to hollow poppet valve body shape and to the desired wall thickness, cutting a groove around the poppet valve head portion of the body with one side of the groove defined by the metal disk portion of the blank, filling the groove with corrosion-resistant metal to form a seating face for the valve head and machining the blank to poppet valve contour, whereby the width of said weld line remains greater than the wall thickness of said valve body.

ARCHIE T. COLWELL.

REFERENCES CITED

The following references are of record in the file of this patent:

UNITED STATES PATENTS

| Number | Name | Date |
| --- | --- | --- |
| 1,294,416 | Dady | Feb. 18, 1919 |
| 1,393,726 | Pfanstiehl | Oct. 11, 1921 |
| 1,498,520 | Blackmore | June 17, 1924 |
| 1,826,549 | Jordine | Oct. 6, 1931 |
| 1,948,793 | Lewis | Feb. 27, 1934 |
| 1,984,751 | McBride | Dec. 18, 1934 |
| 1,991,582 | Sterling | Feb. 19, 1935 |
| 2,009,045 | Flintermann | July 23, 1935 |
| 2,047,306 | Brookins | July 14, 1936 |
| 2,054,375 | Halle | Sept. 15, 1936 |
| 2,093,771 | Colwell | Sept. 21, 1937 |
| 2,101,917 | Plater | Dec. 14, 1937 |
| 2,138,528 | Phillipps | Nov. 29, 1938 |
| 2,193,088 | Charlton | Mar. 12, 1940 |
| 2,316,488 | Rath | Apr. 13, 1943 |
| 2,359,477 | Hoern | Oct. 3, 1944 |
| 2,403,926 | Johnson | July 16, 1946 |
| 2,415,912 | Scherl | Feb. 18, 1947 |